United States Patent
Choy et al.

(10) Patent No.: US 12,031,770 B2
(45) Date of Patent: Jul. 9, 2024

(54) STORAGE ASSEMBLY FOR AN APPLIANCE

(71) Applicant: WHIRLPOOL CORPORATION, Benton Harbor, MI (US)

(72) Inventors: Kaito Choy, St. Joseph, MI (US); Sunil S. Ekshinge, Pune (IN); Omkar S. Mithari, Pune (IN); Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/671,997

(22) Filed: Feb. 15, 2022

(65) Prior Publication Data

US 2023/0258389 A1 Aug. 17, 2023

(51) Int. Cl.
*F25D 23/04* (2006.01)
*F25D 23/02* (2006.01)
*F25D 23/06* (2006.01)

(52) U.S. Cl.
CPC ........... *F25D 23/04* (2013.01); *F25D 23/028* (2013.01); *F25D 23/066* (2013.01)

(58) Field of Classification Search
CPC ...... F25D 23/04; F25D 23/028; F25D 23/067; F25D 23/02; F25D 25/02; F25D 25/022; F25D 25/021; F25D 23/066; A47B 96/06; A47B 96/16; A47B 96/061; A47B 96/067
See application file for complete search history.

(56) References Cited

U.S. PATENT DOCUMENTS

| | | | | |
|---|---|---|---|---|
| 2,006,442 A | * | 7/1935 | Connors | F25D 25/021 312/301 |
| 3,469,711 A | * | 9/1969 | Swaneck | F25D 23/04 312/351 |
| 4,131,203 A | * | 12/1978 | Bridges | A47F 5/0025 211/88.01 |
| 4,160,570 A | * | 7/1979 | Bridges | A47F 5/0853 D6/571 |
| 4,349,113 A | * | 9/1982 | Schreiner | A47F 5/0025 211/208 |
| 4,735,470 A | * | 4/1988 | Falk | F25D 25/021 312/246 |

(Continued)

FOREIGN PATENT DOCUMENTS

| | | | | |
|---|---|---|---|---|
| DE | 19633975 A1 | * | 2/1998 | A47B 57/20 |
| DE | 102018203431 A1 | * | 9/2019 | F25D 23/02 |

(Continued)

OTHER PUBLICATIONS

DE102018203431 translation; 2019.*

*Primary Examiner* — Hiwot E Tefera
(74) *Attorney, Agent, or Firm* — Price Heneveld LLP

(57) ABSTRACT

A door assembly for an appliance includes a wrapper operably coupled with a liner to define an insulation cavity therebetween. An attachment assembly operably couples to the liner and defines a slot. A storage assembly couples with the attachment assembly. The storage assembly includes a bin. The storage assembly further includes a bracket operably coupling the bin to the attachment assembly via a retention feature. The bracket includes a support member defining a groove extending between ends of the bracket. The storage assembly further includes a rim extending from the bin and engaging the groove to secure the bin to the bracket.

5 Claims, 8 Drawing Sheets

(56) References Cited

U.S. PATENT DOCUMENTS

| | | | |
|---|---|---|---|
| 4,829,653 A | 5/1989 | Stich | |
| 5,123,549 A * | 6/1992 | Finses | A47B 63/00 |
| | | | 211/103 |
| 5,346,299 A | 9/1994 | Werkmeister et al. | |
| 7,497,533 B2 * | 3/2009 | Remmers | A47B 96/063 |
| | | | 211/90.01 |
| 9,644,884 B2 | 5/2017 | Kong et al. | |
| 9,816,746 B1 * | 11/2017 | Haney | F25D 23/04 |
| 10,240,854 B2 | 3/2019 | Jung et al. | |
| 10,495,373 B2 * | 12/2019 | Jung | F25D 25/022 |
| 10,619,914 B2 | 4/2020 | Pinheiro et al. | |
| 10,677,514 B2 | 6/2020 | Bento et al. | |
| 10,962,279 B1 | 3/2021 | Scalf et al. | |
| 2005/0285001 A1 * | 12/2005 | Timmerman | A47B 96/067 |
| | | | 248/312.1 |
| 2012/0018435 A1 * | 1/2012 | Kim | F25D 23/04 |
| | | | 220/592.02 |
| 2012/0293056 A1 * | 11/2012 | Kim | F25D 23/04 |
| | | | 312/405.1 |
| 2014/0062283 A1 | 3/2014 | Baldo | |
| 2016/0061513 A1 * | 3/2016 | Gossens | F25D 11/04 |
| | | | 62/448 |
| 2016/0282038 A1 * | 9/2016 | Daniel | F21V 33/0044 |
| 2016/0290706 A1 * | 10/2016 | Rackley | F25D 23/028 |
| 2017/0082351 A1 | 3/2017 | Jung | |
| 2017/0167778 A1 | 6/2017 | Lee | |
| 2017/0276423 A1 * | 9/2017 | Jung | F25D 23/04 |
| 2018/0216874 A1 * | 8/2018 | Pinheiro | F25D 23/04 |

FOREIGN PATENT DOCUMENTS

| | | | | |
|---|---|---|---|---|
| GB | 2203028 A | * | 10/1988 | F25D 23/04 |
| WO | 2011018349 A2 | | 2/2011 | |
| WO | WO-2016023091 A1 | * | 2/2016 | A47B 45/00 |
| WO | 2016107738 A1 | | 7/2016 | |

* cited by examiner

STORAGE ASSEMBLY FOR AN APPLIANCE

BACKGROUND OF THE DISCLOSURE

The present disclosure generally relates to a storage assembly, and more specifically, to a storage assembly for an appliance.

SUMMARY OF THE DISCLOSURE

According to one aspect of the present disclosure, a door assembly for an appliance includes a wrapper that is operably coupled with a liner to define an insulation cavity therebetween. The door assembly includes an attachment assembly that is operably coupled to the liner and defines a slot. The door assembly further includes a storage assembly that is coupled with the attachment assembly. The storage assembly includes a bin. The storage assembly further includes a bracket that operably couples the bin to the attachment assembly via a retention feature. The bracket includes a support member that defines a groove that extends between ends of the bracket. The storage assembly further includes a rim that extends from the bin and engages the groove to secure the bin to the bracket.

According to another aspect of the present disclosure, a storage assembly for an appliance includes a bin that has a base and a sidewall. The sidewall extends upwardly from the base to a periphery defining an opening of the bin. The storage assembly further includes a bracket that operably couples the bin to a vacuum insulated door of the appliance via a retention feature. The bracket includes a support member that defines a groove. The storage assembly further includes a lower rim that extends downwardly from the base and engages the groove.

According to yet another aspect of the present disclosure, a storage assembly for a vacuum insulated door includes a bin having a base and a sidewall. The sidewall extends upwardly from the base to a periphery defining an opening of the bin. The storage assembly includes a bracket that operably couples the bin to the vacuum insulated door via a retention feature. The bracket includes a support member that defines a groove. The storage assembly further includes a rim that extends from the upper periphery and engages the groove to suspend the bin from the bracket.

These and other features, advantages, and objects of the present disclosure will be further understood and appreciated by those skilled in the art by reference to the following specification, claims, and appended drawings.

Figure 1:
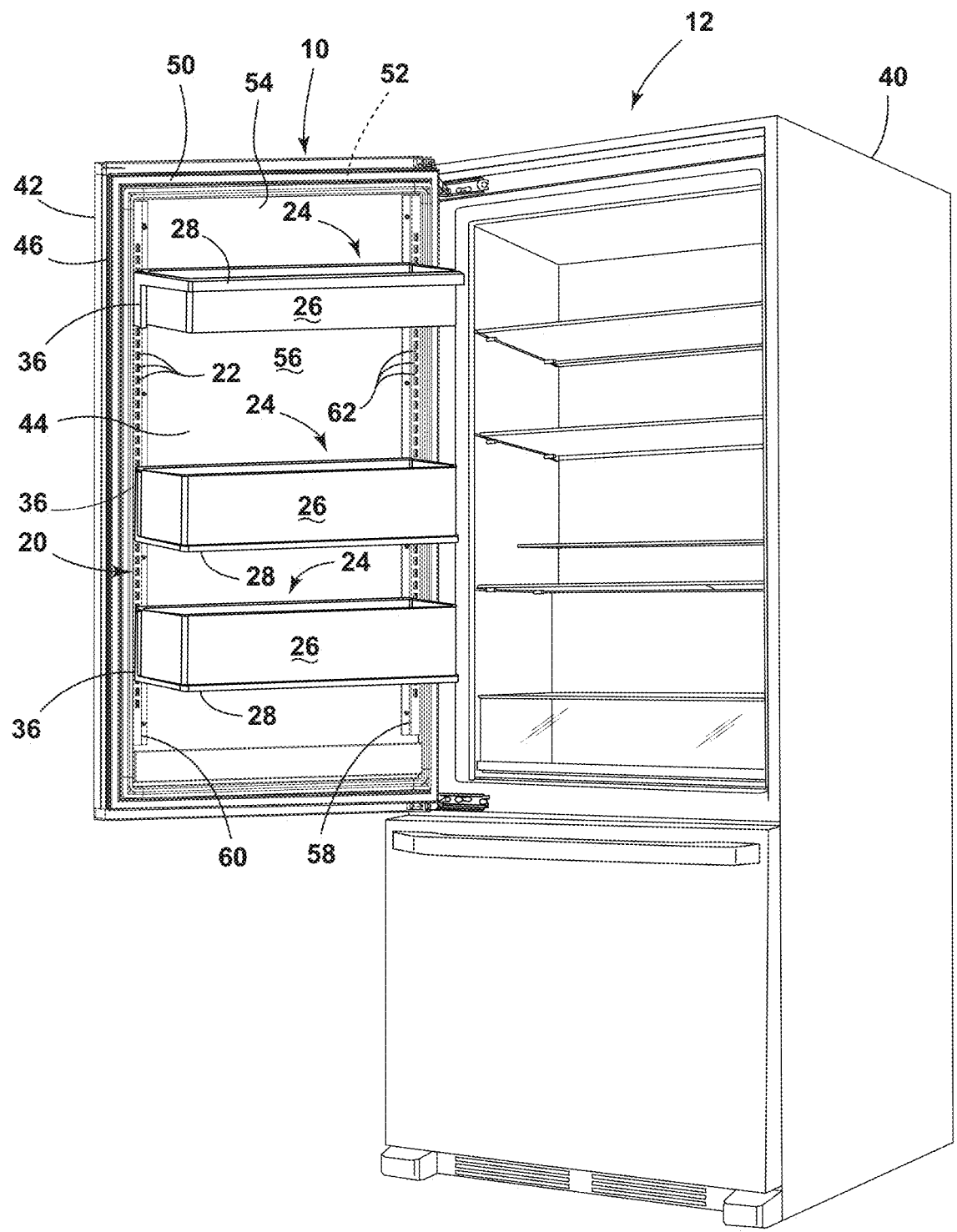
FIG. 1 is a front perspective view of an appliance of the present disclosure with an attachment assembly and a storage assembly.

The components in the figures are not necessarily to scale, emphasis instead being placed upon illustrating the principles described herein.

DETAILED DESCRIPTION

The present illustrated embodiments reside primarily in combinations of method steps and apparatus components related to a storage assembly for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a door assembly 10 for an appliance 12 that includes a wrapper 14 and a liner 16. The wrapper 14 is operably coupled with the liner 16 to define an insulation cavity 18 therebetween. An attachment assembly 20 operably couples to the liner 16 and defines a slot 22. A storage assembly 24 is coupled with the attachment assembly 20. The storage assembly 24 includes a bin 26 and a bracket 28.

The bracket 28 operably couples the bin 26 to the attachment assembly 20 via a retention feature 30. The bracket 28 includes a support member 32 defining a groove 34 extending between ends 36 of the bracket 28. A rim 38a, 38b extends from the bin 26 and engages the groove 34 to secure the bin 26 to the bracket 28.

Figure 2:
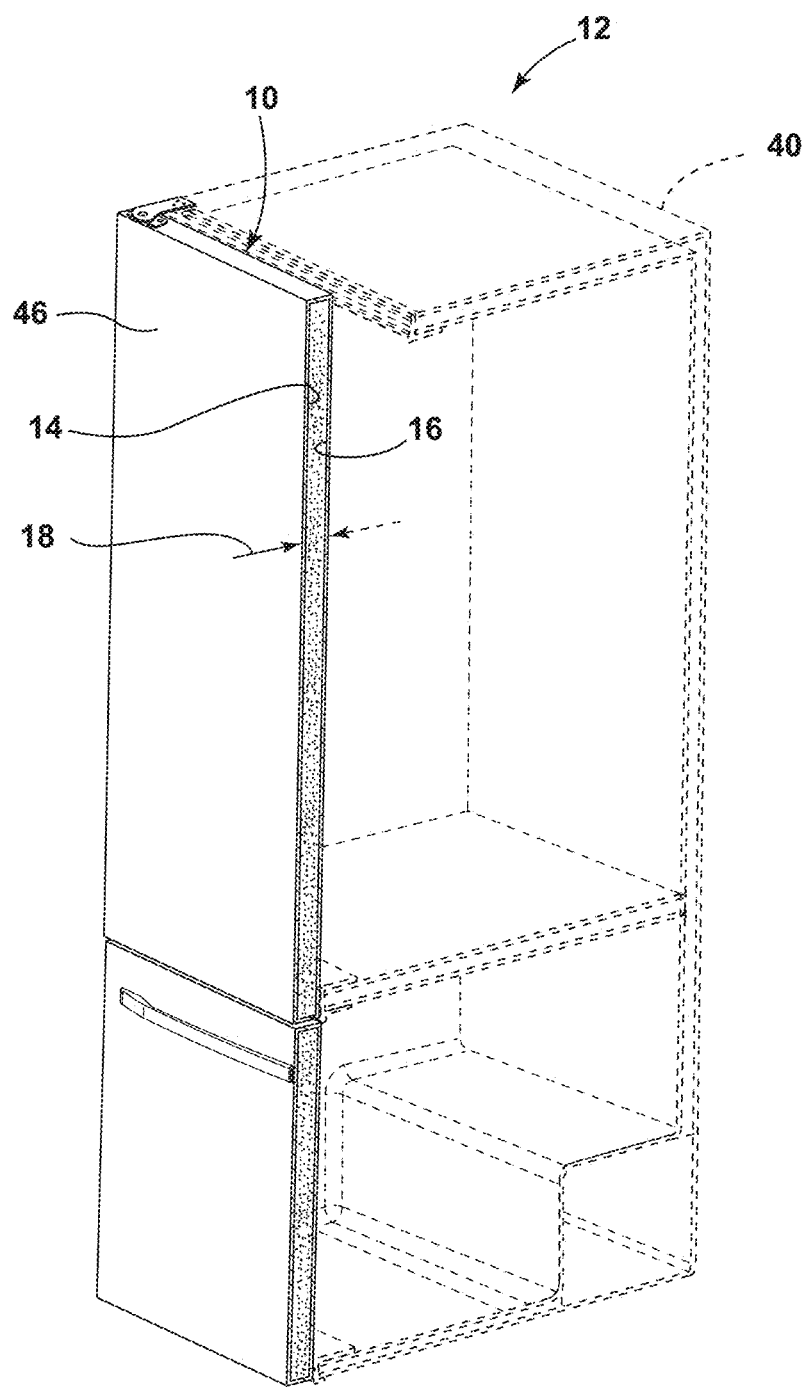
FIG. 2 is a cross-sectional side perspective view of a door assembly of the present disclosure with an insulated structure.
Figure 3:
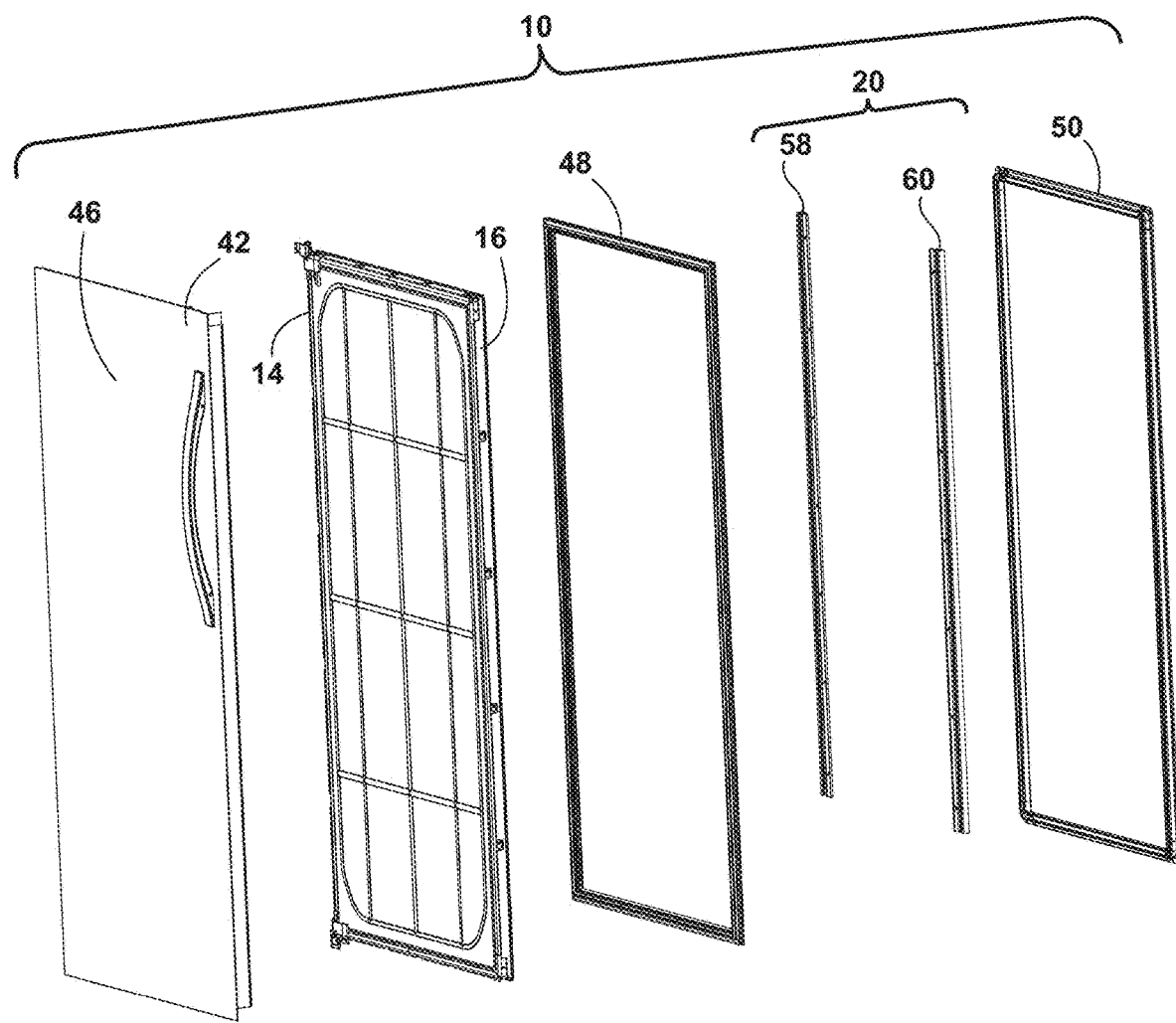
FIG. 3 is an exploded side perspective view of the door assembly of FIG. 2.

Referring now to FIGS. 1-3, the appliance 12 as illustrated includes a body 40 coupled with the door assembly 10. It is also contemplated that the door assembly 10 described herein may be used with a variety of appliances 12 and/or other structures in which vacuum insulation may be advantageous. It is further contemplated that the door assembly 10 described herein may be configured as a vacuum insulated structural cabinet door or a vacuum insulated panel door, as illustrated, that may be used as an insulation member for the appliance 12. The wrapper 14 and the liner 16 may alternatively be referred to as a first panel and a second panel, respectively, and collectively as first and second panels. It is generally contemplated that the first and second panels 14, 16 may be formed from metals, polymers, metal alloys, combinations thereof, and other substantially rigid materials that can be used for vacuum insulated structures within appliances 12. It is generally contemplated that insulation materials may be disposed within the insulation cavity 18 defined between the first and second panels 14, 16. The insulation materials may be a glass type material, a carbon-based powder, silica oxide-based materials, insulating gases, and/or other standard insulation materials practicable for use in a vacuum insulated structure. The insulation material substantially fills the insulation cavity 18 to form a substantially continuous layer between the first and second panels 14, 16. The insulation cavity 18 is evacuated by a vacuum to further define the vacuum insulated structure. It is also contemplated that the attachment assembly 20 described herein may be utilized with an insulated structure that may be free from a vacuum.

Referring still to FIGS. 1-3, the door assembly 10 includes an outer portion 42 and an inner portion 44. An outer shell 46 may be disposed around the first panel 14 to generally conceal the first panel 14 and define the outer portion 42 of the door. It is generally contemplated that the outer portion 42 is defined by the outer shell 46, and the inner portion 44 is defined, at least in part, by the second panel 16. The outer shell 46 may wrap around the first panel 14 to be coupled to a trim breaker 48 that couples with the liner 16 and the wrapper 14 to further define the insulation cavity 18. It is generally contemplated that the trim breaker 48, while partially concealed by the outer shell 46, may be at least partially concealed by a seal member 50 disposed around a perimeter 52 of the inner portion 44 of the door assembly 10.

The first and second panels 14, 16 may be coupled to the trim breaker 48 via an adhesive or other binding member. The coupling of the first and second panels 14, 16 to the trim breaker 48 may define the insulation cavity 18. The adhesive and/or other binding member seals the trim breaker 48 with the first and second panels 14, 16 to seal at least part of the insulation cavity 18. A false panel 54 may be disposed between attachment features 58, 60 of the attachment assembly 20 along the inner panel for covering a central portion 56 of the inner panel. The attachment assembly 20 may include a first attachment feature 58 and a second attachment feature 60, spaced from the first attachment feature 58, with each coupled to the liner 16. It is generally contemplated that the false panel 54 may be approximately flush with the first and second attachment features 58, 60 to define a coplanar configuration. Stated differently, the false panel 54 can be coplanar with the attachment assembly 20 to define the inner portion 44 of the door. Additionally, or alternatively, the false panel 54 may at least partially extend past a portion of the first and second attachment features 58, 60 to partially conceal the first and second attachment features 58, 60 along the inner portion 44 of the door. As illustrated, the first and second attachment features 58, 60 may have a ladder-like configuration with a plurality of slots 22 interspaced by catches 62 that are configured to be engaged by and/or included with the retention features 30.

Figure 4A:
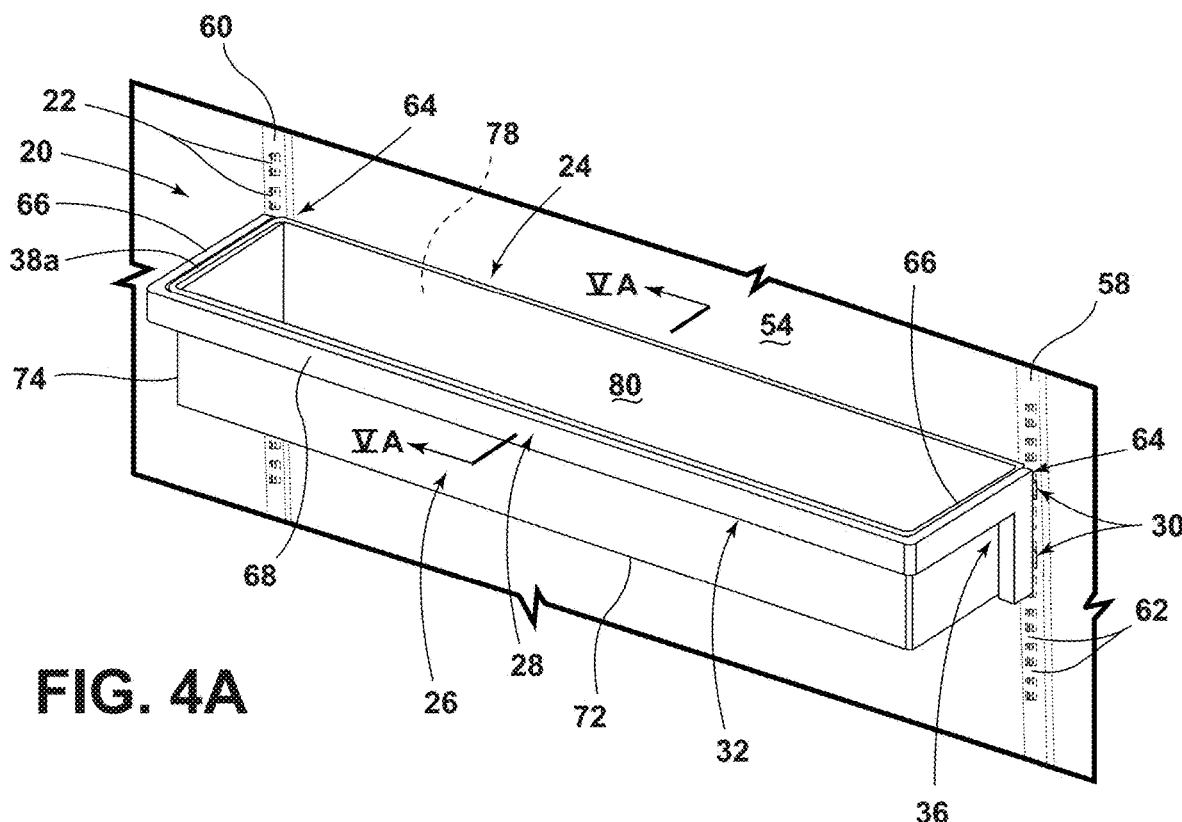
FIG. 4A is a top perspective view of one storage assembly attached to the attachment assembly of FIG. 1.
Figure 4B:
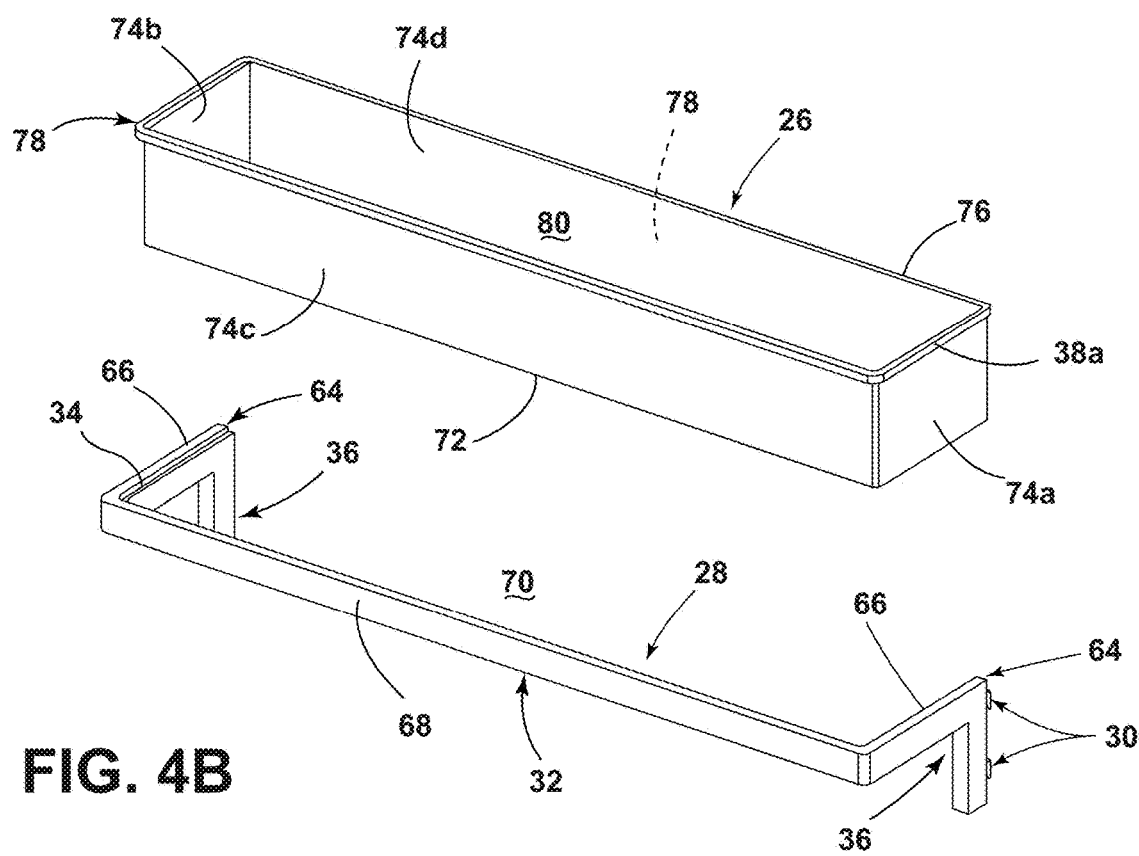
FIG. 4B is an exploded view of the storage assembly of FIG. 4A.

Referring to FIGS. 4A and 4B, the bin 26 of the storage assembly 24 may be moveable between an engaged position, with the bin 26 engaging the bracket 28 (FIG. 4A), and a disengaged position, with the bin 26 disengaged from the bracket 28 (FIG. 4B). Further, the storage assembly 24 may be selectively attachable to the attachment assembly 20. The retention features 30 may extend from the ends 36 of the bracket 28 and engage the slots 22 of the first and second attachment features 58, 60 to secure the bracket 28 to the door assembly 10 to define a secured position. The support member 32 may form a bar extending from a top portion 64 of each end 36. The bar may have a pair of projecting portions 66 and a lateral portion 68 interposing the pair of projecting portions 66 defining a space 70 therebetween. In the engaged position, the bin 26 may hang from the support member 32 along each of the pair of projecting portions 66 and the lateral portion 68 of the support member 32. In this way, a base 72 of the bin 26 may suspend from the bracket 28.

With continued reference to FIGS. 4A and 4B, the bin 26 may be positioned within the space 70 that is defined between the ends 36 of the bracket 28 and the support member 32. The bin 26 may include a sidewall 74 extending upwardly from the base 72. The sidewall 74 may include a first wall 74a spaced from a second wall 74b, and a third wall 74c spaced from a fourth wall 74d. The third and fourth walls 74c, 74d may interconnect the first and second walls 74a, 74b along the rim 38a, 38b to form an upper periphery 76 of the bin 26 that defines an opening 78 of the bin 26. More particularly, an upper portion of the rim 38a, 38b (i.e., upper rim 38a) may extend outwardly from the sidewall 74 to define the upper periphery 76 of the bin 26. As will be discussed further herein, the rim 38a, 38b may also include a lower portion (i.e., a lower rim 38b). The base 72 and sidewall 74 may define a compartment 80 extending therebetween for receiving items, such as refrigeratable items.

Although many types of materials may be implemented in the bracket 28 and/or the bin 26, according to some aspects of the disclosure, the bracket 28 may include aluminum, aluminum alloys, magnesium, magnesium alloys, or any other low density and/or corrosion-resistant material. For example the bracket 28 may be formed from metals, polymers, metal alloys, combinations thereof, and other substantially rigid materials. Further, the bin 26 may be made of a synthetic polymer. In general, the materials incorporated into the bin 26 and bracket 28 may allow the bin 26 and bracket 28 to have substantial rigidity. Although the storage assembly 24 is illustrated as having a single bin 26, it is generally contemplated that a single bracket 28 may be configured to support a plurality of bins in the space 70. For example, two bins may be positioned side-by-side in the bracket 28 and each have an unsupported first, second, third, or fourth sidewall 74a, 74b, 74c, 74d. Additionally, or alternatively, one or more third projecting portions (not shown) may be disposed between the pair of projecting portions 66 to allow two or more bins 26 to be supported in a single bracket 28. The additional third projecting portions may interact with additional attachment features of the door assembly 10 or, alternatively, may support the additional bins 26 via a rigid material (e.g., aluminum) implemented in the bracket 28.

Figure 5A:
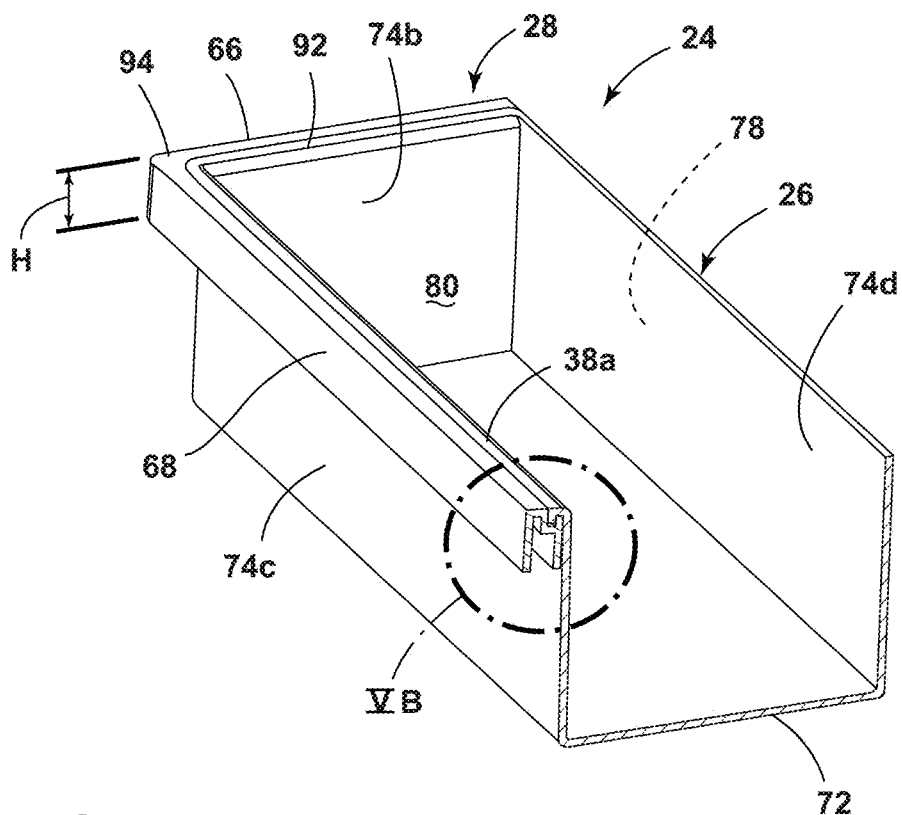
FIG. 5A is a cross-sectional view of the storage assembly of FIG. 4A taken at line VA-VA.
Figure 5B:
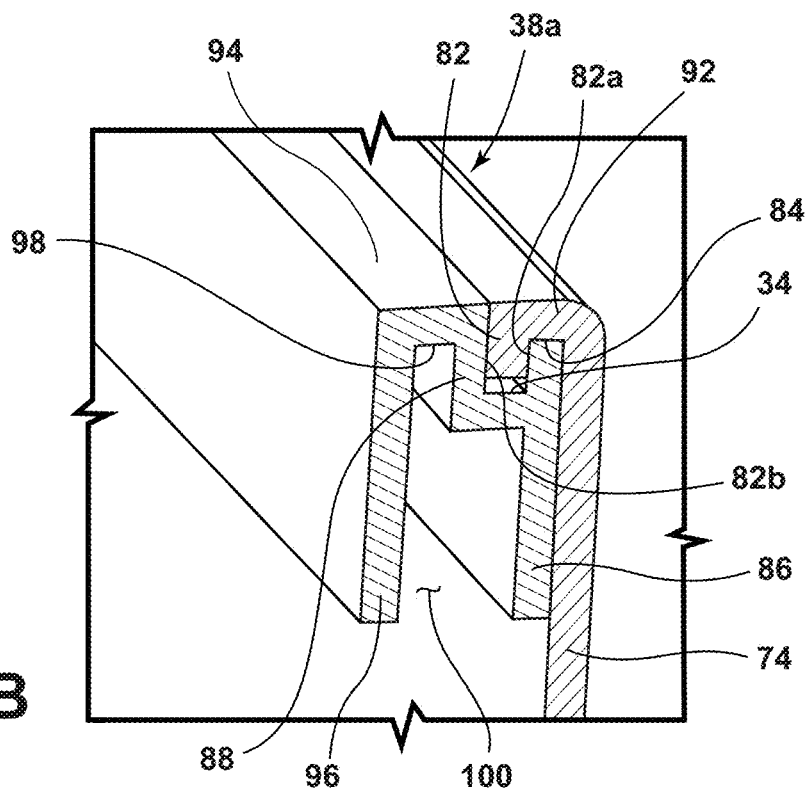
FIG. 5B is an enlarged partial cross-sectional view of the storage assembly of FIG. 5A taken at area VB.

Referring to FIGS. 5A and 5B, a lip 82 extends downwardly from the upper rim 38a along at least a portion of the sidewall 74 of the bin 26. The lip 82 is spaced from the sidewall 74 to define a notch 84 therebetween for receiving at least a portion of the bracket 28. The support member 32 includes a first segment 86 and a second segment 88, spaced from the first segment 86, to define the groove 34 therebetween. The first segment 86 of the support member 32 engages the notch 84 to form a first part of a mating connection. The first segment 86 engages a first surface 82a of the lip 82. According to one aspect of the disclosure, a second surface 82b of the lip 82, opposite the first surface 82a, engages the second segment 88. In this way, the lip 82 may be sandwiched by the first and second segments 86, 88 in the groove 34 to form a second part of the mating connection. This arrangement of the storage assembly 24 allows the bin 26 to be easily removed and/or exchanged for another bin 26 while maintaining stability of the bracket 28 relative to the door assembly 10. For example, the two-part mating connection may be disrupted by lifting the bin 26 from the bracket 28, but may resist disruption due to lateral movement of the bin 26 and/or downward movement of the bin 26.

The upper rim 38a may further include a brim 92 extending generally perpendicularly to the sidewall 74 of the bin 26 between the sidewall 74 and the lip 82. The brim 92 may be generally coextensive with a top surface 94 of the support member 32. Stated differently, the brim 92 may be substantially flush with the top surface 94 of the bracket 28. The bracket 28 may also include a third segment 96 spaced from the second segment 88 to define an aperture 98 therebetween. The third segment 96 may visibly shield the mating connection from an external view of the storage assembly 24. For example, as illustrated, the third segment 96 may extend generally parallel with the sidewall 74, the first segment 86, and the second segment 88, and extend along a height H of the support member 32 to conceal the first and/or second segments 86, 88.

In the engaged position, the sidewall 74, the brim 92, and the lip 82 may engage the first segment 86 in an abutment relationship. Further, in the engaged position, the lip 82 engages the second segment 88, such that the lip 82 may be sandwiched between the first segment 86 and the second segment 88. In this way, an upper surface of the first segment 86 may be recessed relative to an upper surface of the second segment 88 (e.g., the top surface 94 of the support member 32). By recessing the upper surface of the first segment 86 relative to the second segment 88, the upper rim 38a may be substantially flush with the support member 32 in the engaged position. In general, although the support member 32 is generally illustrated having a hollow 100 and/or the aperture 98 between the third segment 96 of the first segment 86, the support member 32 may fully or partially fill the hollow 100 according to some aspects of the disclosure.

It is generally contemplated that the upper rim 38a may extend along only a portion of the upper periphery 76. For example, the upper rim 38a may extend along the first, second, and third sidewalls 74a, 74b, 74c and be omitted from the fourth sidewall 74d. The omission of the upper rim 38a from the fourth sidewall 74d may allow the bin 26 to engage the false wall of the door assembly 10 along the fourth sidewall 74d. The bin 26 may couple to the first and second attachment features 58, 60 and abut the false panel 54 between the first and second attachment features 58, 60. The coplanar configuration of the attachment assembly 20 and the false wall 54 54 may provide additional stability for the bin 26 along the inner portion 44. The abutment of the bin 26 with the false panel 54 may also reduce rattling or other movement of the bin 26 relative to the door. As described in more detail below, other configurations of the storage assembly 24 further assist in stabilizing the bin 26 relative to the inner portion 44 as a result of the configuration of the storage assembly 24. For example, as illustrated, the upper rim 38a extending along the first, second, and third walls 74a, 74b, 74c, may allow the bin 26 to remain secured to the bracket 28 in lateral (e.g., side, forward, and backward) directions.

Figure 6A:
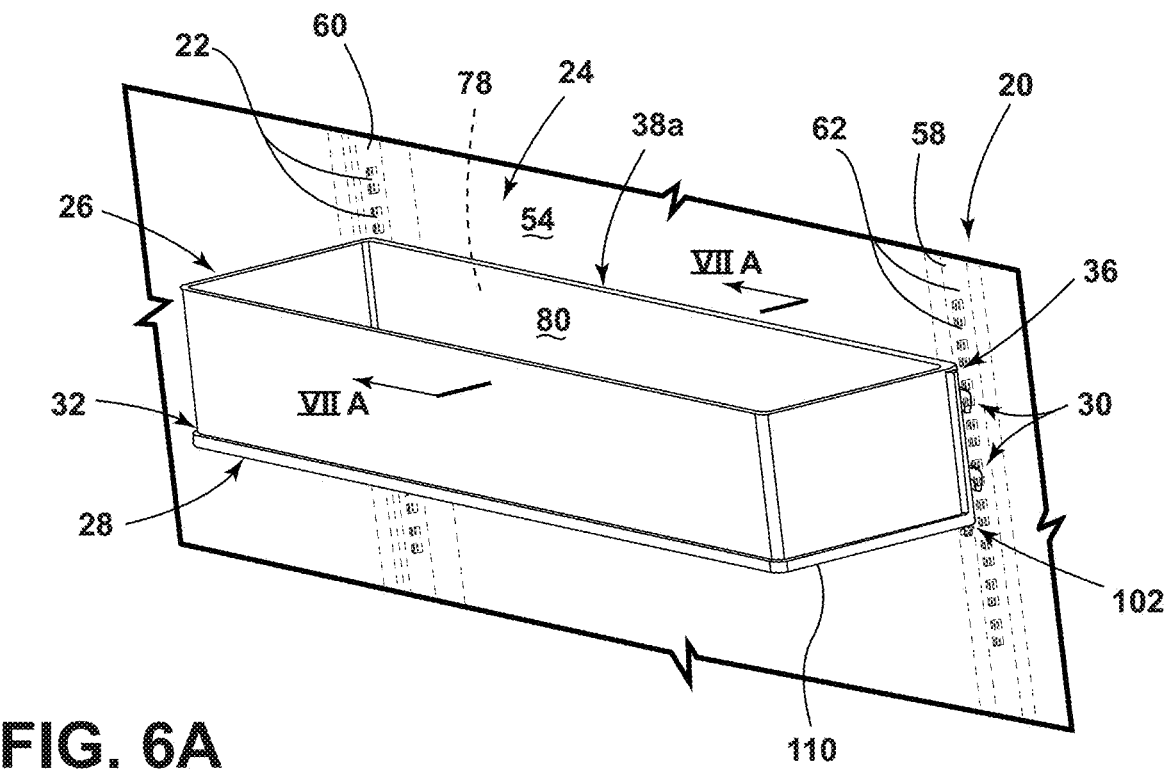
FIG. 6A is a top perspective view of one storage assembly attached to the attachment assembly of FIG. 1.
Figure 6B:
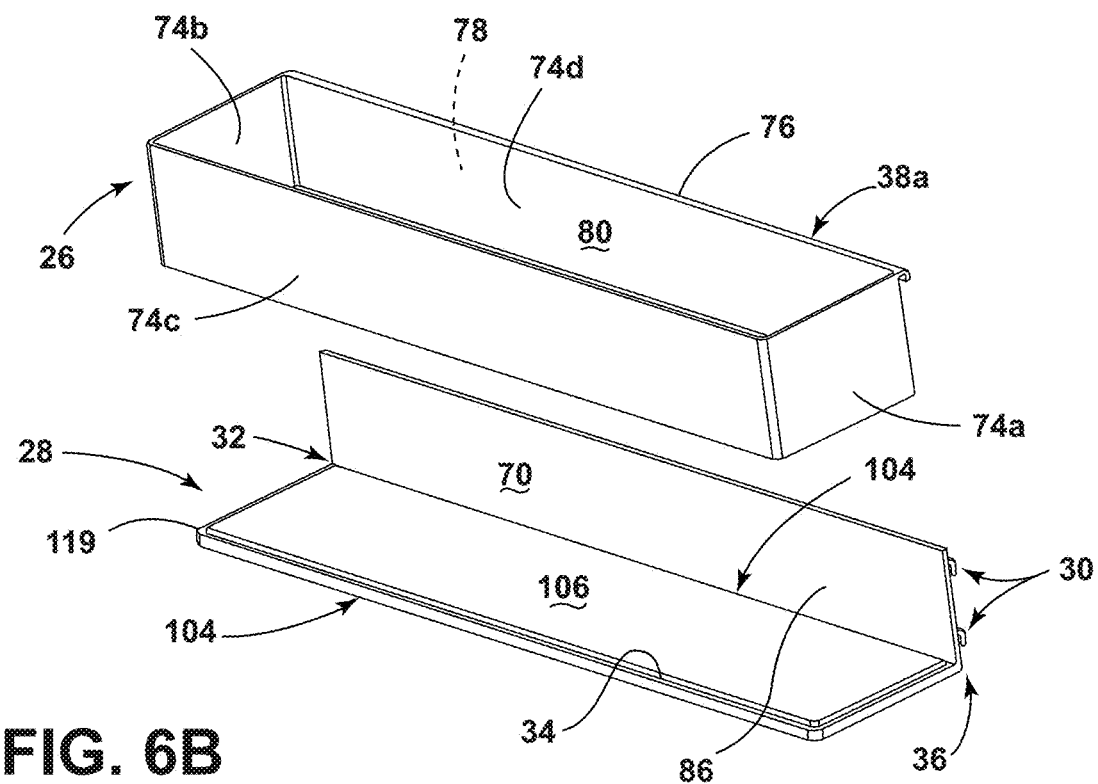
FIG. 6B is an exploded view of the storage assembly of FIG. 6A.

Referring now to FIGS. 6A and 6B, the support member 32 may be coupled to a lower portion 102 of the ends 36 of the bracket 28. The first segment 86 of the bracket 28 may extend between the ends 36 of the bracket 28 and along the false wall and/or the attachment assembly 20 to generally form an L-shape of the bracket 28. The support member 32 may include a planar extent 104, extending outwardly from the first segment 86 for coupling with the base 72 of the bin 26. More specifically, the groove 34 may be disposed on the planar extent 104 and circumscribe a support plate 106, or platform, protruding upwardly from the support member 32 for abutting the base 72 of the bin 26 when the bin 26 engages bracket 28. In this way, the support plate 106 may be bounded by the groove 34. As illustrated, the upper rim 38a may only extend along the upper periphery 76 of the sidewall 74 adjacent the fourth sidewall 74d, with the upper rim 38a omitted along the first, second, and third sidewalls 74a, 74b, 74c.

Figure 7A:
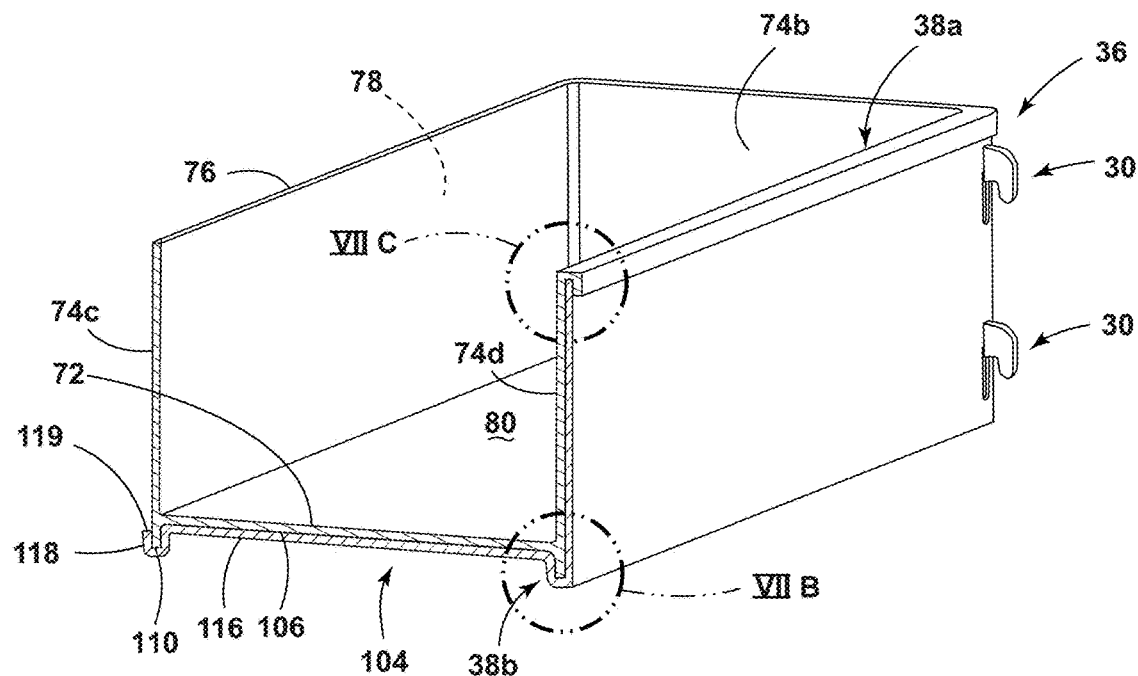
FIG. 7A is a cross-sectional view of the storage assembly of FIG. 6A taken at line VIIA-VIIA.
Figure 7B:
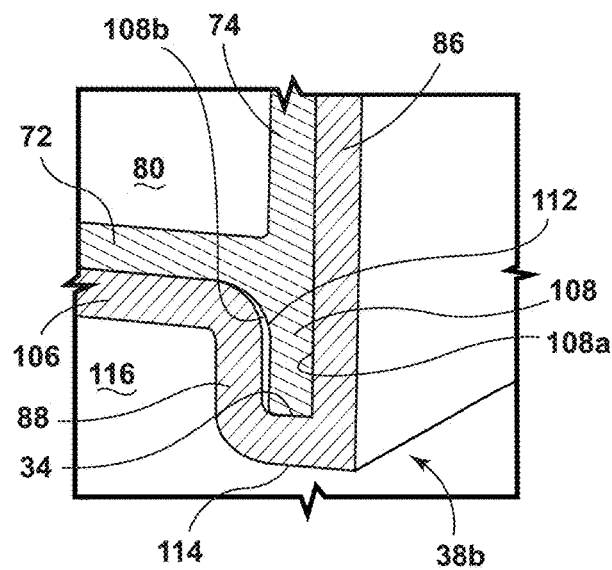
FIG. 7B is an enlarged partial cross-sectional view of the storage assembly of FIG. 7A taken at area VIIB.
Figure 7C:
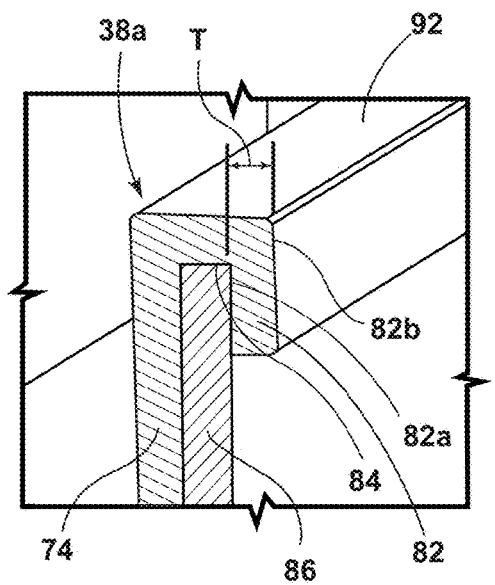
FIG. 7C is an enlarged partial cross-sectional view of the storage assembly of FIG. 7A taken at the area VIIC.

Referring now to FIGS. 7A-7C, the sidewall 74 may extend downwardly, past the base 72 of the bin 26, to form the lower rim 38b. The lower rim 38b may include a protrusion 108 extending generally orthogonally relative to the base 72 of the bin 26 and generally parallel with the sidewall 74 about a lower periphery 110 of the bin 26. As depicted, the protrusion 108 may be substantially coplanar with the sidewall 74. The base 72 may interpose the protrusion 108 and the sidewall 74 to form a generally T-shaped cross-section at a junction of the base 72 and the sidewall 74. It is generally contemplated that the protrusion 108 may extend from any portion of the base 72, including a central portion of the base 72. Further, the protrusion 108 may extend at an oblique angle relative to the base 72. The protrusion 108 engages the groove 34 to secure the bin 26 to the bracket 28. The protrusion 108 may extend along the entire lower periphery 110 of the base 72 or only portions of the lower periphery 110. Because the lower rim 38b may be disposed in the groove 34 along the first, second, and third sidewalls 74a, 74b, 74c, the bin 26 may be fixedly secured against lateral movement. In addition, as illustrated, the lower rim 38b may extend along fourth sidewall 74d for additional securement with the bracket 28. The lower rim 38b along the fourth sidewall 74d may be omitted due to inclusion of the upper rim 38a. Stated differently, the mating connection between the bracket 28 and the bin 26 at the upper rim 38a may resist lateral movement away from the door assembly 10 in the engaged position.

Referring more particularly to FIGS. 7A and 7B, the second segment 88 may be spaced from the first segment 86 by the groove 34 along the lower rim 38b, as opposed to being spaced from the first segment 86 along the upper rim 38a as depicted in FIGS. 4A-5B. As depicted in FIGS. 6A-7B, the second segment 88 may be spaced radially inwardly from the first segment 86. The first segment 86 may be operable to engage a third surface 108a of the protrusion 108 in the engaged position. A fourth surface 108b of the protrusion 108, opposite the third surface 108a, is operable to engage the second segment 88. In this way, the protrusion 108 is sandwiched by the first and second segments 86, 88 in the groove 34 to form the second part of a mating connection. As illustrated, the second segment 88 and the fourth surface 108b each may be curved. The radius of curvature of the second segment 88 may be different from the radius of curvature of the fourth surface 108b, such that a slight gap 112 may extend between the second segment 88 and the fourth surface 108b to reduce the risk of the bin 26 becoming jammed in the bracket 28 when the bin 26 is lifted from or placed in the bracket 28. It is generally contemplated that the protrusion 108 engaging the groove 34 may form a third mating connection, such that the second mating connection described in reference to FIGS. 5A and 5B may be incorporated at the upper rim 38a of the bin 26. Stated differently, bracket 28 may incorporate the bar described in reference to FIGS. 4A-5B with features of the planar extent 104 described in reference to FIGS. 6A-7C.

The second segment 88 may extend generally parallel with the first segment 86 between a bottom surface 114 of the bracket 28 and the support plate 106. In this way, the support plate 106 and the second segment 88 may define an indentation 116 extending into the planar extent 104. It is generally contemplated that the indentation 116 may be omitted and that the planar extent 104 may fully or partially fill the indentation 116 according to aspects of the present disclosure.

As illustrated in FIG. 7A, the lower rim 38b may include a projection 118 extending about an outer edge 119 of the planar extent 104. The outer edge 119 may be disposed along portions of the planar extent 104 corresponding to the first, second, and third sidewalls 74a, 74b, 74c. In this way, the projection 118 may be continuous with the first segment 86 and extend generally parallel with the first segment 86. Similar to the first segment 86, the projection 118 may also extend generally parallel with the second segment 88, such that the projection 118 is at least partially concentric with the second segment 88. The projection 118 may provide additional stability against lateral movement of the bin 26 relative to the bracket 28 to further reduce rattling of the bin 26. It is generally contemplated that the projection 118 may be fully or partially omitted.

Figure 8:
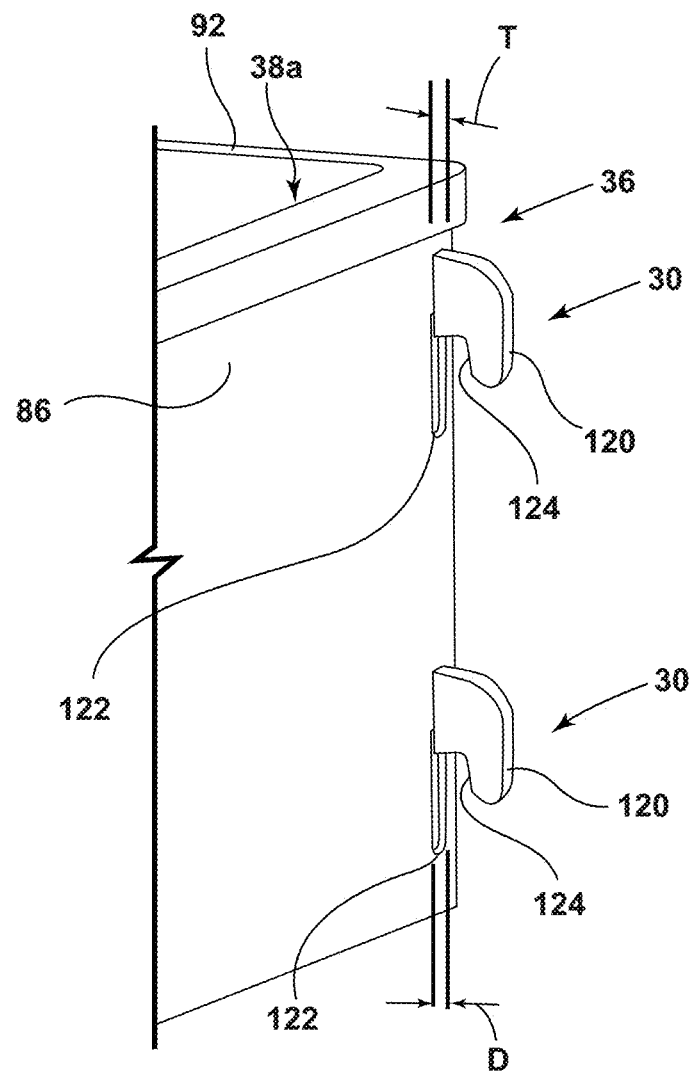
FIG. 8 is a perspective view of a pair of retention features of the storage assembly of FIG. 7A.

Referring to FIG. 8, each retention feature 30 may include a hook 120 and a spacing member 122. The hook 120 may include an engaging surface 124 that forms approximately a right angle for engaging the catches 62 of the attachment features 58, 60. According to some embodiments, the engaging surface 124 may be arcuate in shape or define a polygonal shape that engages the catches 62 to secure the bracket 28 in an upright configuration. The spacing member 122 has a generally elongated shape and is disposed below the hook 120 for abutting at least one of the catches 62. According to some embodiments, a length of the spacing member 122 exceeds a length of the slots 22, such that the spacer spans at least one slot 22. When the hooks 120 are disposed in the slots 22 in the secured position, the spacing member 122 may abut the attachment features 58, 60 to hold the bracket 28 in the upright configuration. According to some aspects of the present disclosure, the spacing member 122 and the engaging surface 124 sandwich the catch 62.

The spacing member 122 may also define a gap between the bracket 28 and the door assembly 10 in the secured position. The gap 112 may have a width that corresponds to a depth D of the spacing member 122 in a direction generally orthogonal to the first segment 86. Similarly, the depth D of the spacing member 122 may be substantially the same as, or marginally larger than a thickness T of the lip 82. In this way, in the engaged position, the bin 26 may appear continuous with the false panel 54.

In general, a two-part construction of the storage assembly 24 may provide the attachment assembly 20 a smaller tolerance for the slots 22 and the retention features 30. For example, because the bracket 28 may be a single-piece bracket (i.e., integrally formed), the size of the slot 22 may be only marginally larger than the size of the hook 120. Further, because one end of the bracket 28 may maintain the same orientation relative to the other end due to the singe-piece construction, misalignments between the ends of the bracket 28 may be less likely to occur than misalignments between ends of multi-part brackets.

The invention disclosed herein is further summarized in the following paragraphs and is further characterized by combinations of any and all of the various aspects described therein.

According to one aspect of the present disclosure, a door assembly for an appliance includes a wrapper that is operably coupled with a liner to define an insulation cavity therebetween. The door assembly includes an attachment assembly that is operably coupled to the liner and defines a slot. The door assembly further includes a storage assembly that is coupled with the attachment assembly. The storage assembly includes a bin. The storage assembly further includes a bracket that operably couples the bin to the attachment assembly via a retention feature. The bracket includes a support member that defines a groove that extends between ends of the bracket. The storage assembly further includes a rim that extends from the bin and engages the groove to secure the bin to the bracket.

According to another aspect, the rim includes an upper portion that extends from an upper periphery of the bin. The upper portion includes a lip spaced from a sidewall of the bin and defining a notch that extends therebetween. The support member includes a first segment that engages the notch.

According to another aspect, the bracket includes a second segment spaced from the first segment by the groove. The first and second segments engage opposing surfaces of the lip.

According to another aspect, the rim includes a lower portion having a protrusion extending from a base of the bin. The bracket includes a second segment spaced from the first segment by the groove. The first and second segments engage opposing surfaces of the protrusion.

According to another aspect, the protrusion is substantially coplanar with the sidewall.

According to another aspect, the base interposes the sidewall and the protrusion.

According to another aspect, the retention feature includes a hook that extends from at least one of the ends of the bracket and engages the slot defined by the attachment assembly.

According to another aspect, the bracket includes a support plate bounded by the groove and engaging a base of the bin.

According to another aspect, a base of the bin suspends from the bracket.

According to another aspect of the present disclosure, a storage assembly for an appliance includes a bin that has a base and a sidewall. The sidewall extends upwardly from the base to a periphery defining an opening of the bin. The storage assembly further includes a bracket that operably couples the bin to a vacuum insulated door of the appliance via a retention feature. The bracket includes a support member that defines a groove. The storage assembly further includes a lower rim that extends downwardly from the base and engages the groove.

According to another aspect, an upper rim extends outwardly from the sidewall to define a notch. The support member includes a first segment that engages the notch.

According to another aspect, the upper rim includes a lip spaced from the sidewall to further define the notch. The sidewall and the lip engage opposite surfaces of the first segment.

According to another aspect, a second segment is spaced from the first segment by the groove. The first segment and the second segment engage opposing surfaces of the lower lip.

According to another aspect, the lower rim is substantially coplanar with the sidewall.

According to another aspect, the base interposes the sidewall and the lower rim.

According to another aspect, the bracket includes a support plate bounded by the groove and engaging a base of the bin.

According to yet another aspect of the present disclosure, a storage assembly for a vacuum insulated door includes a bin having a base and a sidewall. The sidewall extends upwardly from the base to a periphery defining an opening of the bin. The storage assembly includes a bracket that operably couples the bin to the vacuum insulated door via a retention feature. The bracket includes a support member that defines a groove. The storage assembly further includes a rim that extends from the upper periphery and engages the groove to suspend the bin from the bracket.

According to another aspect, the rim includes a lip spaced from a sidewall of the bin to define a notch therebetween. The bracket includes a first segment that extends from the support member and engages the notch.

According to another aspect, a second segment is spaced from the first segment by the groove. The first segment and the second segment engage opposing surfaces of the lip.

According to another aspect, the rim is substantially flush with a top surface of the support member.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A door assembly for an appliance, comprising:
   a wrapper operably coupled with a liner to define an insulation cavity therebetween;
   an attachment assembly operably coupled to the liner and defining a slot; and
   a storage assembly coupled with the attachment assembly, the storage assembly including:
      a bin;
      a bracket operably coupling the bin to the attachment assembly via a retention feature, the bracket including a support member spaced from the liner by a space, wherein the bin is positioned within the space, the support member defining a groove extending between ends of the bracket; and
      a rim extending from the bin and engaging the groove to secure the bin to the bracket, wherein engagement of the rim with the groove restricts lateral movement of the bin relative to the bracket and allows lifting of the bin from the bracket, wherein the rim includes an upper portion extending from an upper periphery of the bin, the upper portion including a lip spaced from a sidewall of the bin and defining a notch extending therebetween, wherein the support member includes a first segment engaging the notch, wherein the bracket includes a second segment spaced from the first segment by the groove, wherein the first and second segments are configured to engage opposing surfaces of the lip, wherein the groove extends from a top-most surface of the bracket.

2. The door assembly of claim 1, wherein a base of the bin suspends from the bracket.

3. The door assembly of claim 1, wherein the retention feature includes a hook extending from at least one of the ends of the bracket.

4. A storage assembly for a door of an appliance, comprising:
   a bin;
   a bracket operably coupling the bin to said door via a retention feature, the bracket including a support member spaced from said door by a space, wherein the bin is positioned within the space, the support member defining a groove extending between ends of the bracket; and a rim extending from the bin and engaging the groove to secure the bin to the bracket, the rim including an upper portion extending from an upper periphery of the bin, the upper portion including a lip spaced from a sidewall of the bin and defining a notch extending therebetween, wherein the support member includes a first segment engaging the notch and the bracket includes a second segment spaced from the first segment by the groove, wherein the first and second segments are configured to engage opposing surfaces of the lip, wherein the groove extends from a top-most surface of the bracket.

5. The storage assembly of claim 4, wherein engagement of the rim with the groove restricts lateral movement of the bin relative to the bracket and allows lifting of the bin from the bracket.

\* \* \* \* \*